United States Patent [19]

Schilling et al.

[11] Patent Number: 4,478,642

[45] Date of Patent: Oct. 23, 1984

[54] AMPHOTERICS AS EMULSIFIERS FOR BITUMINOUS EMULSIONS

[75] Inventors: Peter Schilling; Hans G. Schreuders, both of Charleston, S.C.

[73] Assignee: Westvaco Corporation, New York, N.Y.

[21] Appl. No.: 505,714

[22] Filed: Jun. 20, 1983

[51] Int. Cl.³ .............................................. C08L 95/00
[52] U.S. Cl. ................................ 106/277; 106/273 N; 106/281 N
[58] Field of Search ............... 106/281 R, 281 N, 277, 106/273 N; 208/44; 252/311.5, 108, 117, 156; 260/501.1

[56] References Cited

U.S. PATENT DOCUMENTS

| | | | |
|---|---|---|---|
| 2,329,086 | 9/1943 | Robinson et al. | 260/401 |
| 2,743,288 | 4/1956 | Rueggeberg et al. | 260/400 |
| 2,966,478 | 12/1960 | Harrison | 260/47 |
| 3,006,860 | 10/1961 | Heinz | 252/311.5 |
| 3,062,829 | 11/1962 | Wright et al. | 252/311.5 |
| 3,097,174 | 7/1963 | Mertens | 252/311.5 |
| 3,123,569 | 3/1964 | Borgfeldt | 252/311.5 |
| 3,220,953 | 11/1965 | Borgfeldt | 252/311.5 |
| 3,230,104 | 1/1966 | Falkenberg et al. | 106/277 |
| 3,344,082 | 9/1967 | Montgomery et al. | 252/311.5 |
| 3,350,321 | 10/1967 | Conn | 252/311.5 |
| 3,445,258 | 5/1969 | Ferm et al. | 106/277 |
| 3,466,247 | 9/1969 | Ohtsuka et al. | 252/311.5 |
| 3,518,101 | 6/1970 | Gzemski et al. | 106/277 |
| 3,594,201 | 7/1971 | Sommer et al. | 106/277 |
| 3,615,796 | 10/1971 | Schreuders | 106/277 |
| 3,728,278 | 4/1973 | Tramelli | 252/311.5 |
| 3,738,852 | 6/1973 | Doi et al. | 106/277 |
| 3,753,968 | 8/1973 | Ward | 260/97.6 |
| 3,764,359 | 10/1973 | Dybalski | 106/280 |
| 3,867,162 | 2/1975 | Elste, Jr. | 106/277 |
| 3,899,476 | 8/1975 | Ward | 260/97.5 |
| 3,956,002 | 5/1976 | Moorer | 106/277 |
| 3,957,524 | 5/1976 | Doughty et al. | 106/277 |
| 4,013,601 | 3/1977 | Alford | 260/18 PN |
| 4,081,462 | 3/1978 | Powers et al. | 260/501.1 |
| 4,088,505 | 5/1978 | Moorer | 106/277 |

FOREIGN PATENT DOCUMENTS

| | | |
|---|---|---|
| 571474 | 1/1976 | Switzerland . |
| 1046208 | 10/1966 | United Kingdom . |
| 1278421 | 6/1970 | United Kingdom . |

OTHER PUBLICATIONS

*Chemical Abstracts*, vol. 66, (1967), p. 218, 2223z.
*Chemical Abstracts*, vol. 79, (1973), p. 176, 81434a.
*Official Gazette*, vol. 911, No. 3, (Jun. 19, 1973), p. 1006, U.S. Pat. No. 3,740,344.
*Chemical Abstracts*, vol. 86, (1977), p. 550, 189248b.
*Chemical Abstracts*, vol. 87, (1977), pp. 85, 169578b and 108, 70170a.
*Chemical Abstracts*, vol. 88, (1978), pp. 36–37, 122176z.

*Primary Examiner*—Paul Lieberman
*Assistant Examiner*—Amelia B. Yarbrough
*Attorney, Agent, or Firm*—Terry B. McDaniel; Richard L. Schmalz

[57] ABSTRACT

Novel amphoteric emulsifiers are disclosed for solventless and solvent containing mixing grade, oil-in-water anionic and cationic bituminous emulsions, which emulsifiers are the modified reaction products of polyamines with certain polycarboxylic acids and sulfonated carboxylic acids. Modifications are carried out by reacting the nitrogen-containing intermediate with formaldehyde and sodium sulfite or bisulfite, chloroalkane sulfonic acid salts, γ-propane sultone, chloroalkane phosphonic acids, acrylic acid, fumaric acid, maleic acid and chloroethanoic acid.

29 Claims, No Drawings

AMPHOTERICS AS EMULSIFIERS FOR BITUMINOUS EMULSIONS

BACKGROUND OF THE INVENTION (1) Field of the Invention

This invention relates to medium set mixing grade asphalt emulsions and rapid set emulsions. More particularly, it relates to novel amphoteric emulsifiers for solventless and solvent containing mixing grade, oil-in-water anionic and cationic bituminous emulsions, which emulsifiers are the modified reaction products of polyamines with certain polycarboxylic acids and sulfonated carboxylic acids. Modifications are carried out by reacting the nitrogen-containing intermediates with formaldehyde and sodium sulfite or bisulfite, chloroalkane sulfonic acid salts, $\gamma$-propane sultone, chloromethane phosphonic acid, acrylic acid, fumaric acid, maleic acid and chloroalkanoic acids.

(2) Description of the Prior Art

In paving operations, three main practices are employed to achieve thorough mixing of bitumen and aggregate:

(1) mixing of free flowing heated asphalt (asphalt cement) with pre-dried aggregate;

(2) mixing pre-dried aggregate with asphalt diluted with a hydrocarbon solvent (cutback asphalt, cutter stock) at ambient temperatures; and (3) mixing aggregate with asphalt emulsions, e.g., oil-in-water emulsions, obtained by vigorous agitation of asphalt and water in the presence of an emulsifying agent.

Because of increasing cost in energy and hydrocarbon solvents and because of environmental concerns, the use of emulsified asphalt is increasing. Dependent on the emulsifier used to achieve an emulsion, anionic or cationic emulsions are obtained. In anionic emulsions, asphalt droplets are negatively charged; in cationic emulsions, the asphalt droplets bear positive charges and migrate to the cathode when an electric field is applied.

Generally, depending on the characteristics of the type of mixing and rate of break, bituminous emulsions are classified as rapid setting, medium setting and slow setting. In the case of rapid setting emulsions, mainly used for repair work of old wearing courses, the emulsion is applied on the existing surface and aggregate is spread on top, and after compaction, the road can be opened to traffic shortly after the application of the new coat (chip seal, etc.). Medium setting emulsions are mixed with aggregate prior to being used in road construction, and slow set emulsions can be mixed with aggregate and stored for a longer period of time without breaking on the aggregate surface.

Anionic bituminous emulsions are taught by Wright and Mertens in U.S. Pat. No. 3,062,829 to be prepared by employing alkali emulsifier and polyamide additives which are the condensation products of dilinoleic acid and polyalkylene polyamines. Lignin amines are taught as anionic emulsifiers in U.S. Pat. No. 3,123,569 to Borgfeldt. Also, Moorer, in U.S. Pat. No. 3,956,002, teaches an anionic emulsifier consisting of an oxygenated alkali lignin, an ethylene oxide adduct of phenol, and up to 10% by weight of sodium borate; and, in U.S. Pat. No. 4,088,505, he teaches an anionic emulsifier consisting of an alkali metal salt of an alkali lignin, an ethylene oxide adduct of phenol and water. In addition, Montgomery and Pitchford teach the alkali metal salts of complex polynuclear aromatic polycarboxylic acids as anionic asphalt emulsifiers in U.S. Pat. No. 3,344,082. Heinz, in U.S. Pat. No. 3,006,860, similarly employs alkali metal soaps of higher fatty acids as those found in tall oil.

Ferm, in U.S. Pat. No. 3,740,344, teaches the preparation of quick-setting anionic slurry seal compositions by applying a combination of anionic emulsifiers such as aryl alkyl sulfonates and condensation products of ethylene oxide with alkylated phenols, with fatty alcohols, with mono-esters of fatty acids with glycerol or sorbitol or long chain fatty acids. H. G. Schreuders, in U.S. Pat. No. 3,615,796, teaches the use of petroleum sulfonates as quick-setting anionic slurry seal emulsifiers. A combination of sodium lignate or lignosulfonate and saponified rosin or tall oil is described in U.S. Pat. No. 3,594,201 by Sommer and Evans. Also, Conn, in U.S. Pat. No. 3,350,321, describes the use of alkyl or alkoxyalkyl phosphoric acids as emulsifiers for asphalts.

Cationic emulsions are obtained by employing a variety of nitrogen containing organic compounds, such as fatty amines, fatty diamines, fatty triamines, fatty amidoamines, fatty imidazolines, and reaction products of all these compounds with ethylene oxide and fatty mono- and diquaternary ammonium salts. The fatty radical of these compounds can have a variety of chemical structures, and the building blocks for the preparation of these amines can be obtained from a variety of sources, such as petroleum refinates, animal fats, vegetable and fish oils, and tall oil. Amidoamines suitable as emulsifiers are disclosed in U.S. Pat. No. 3,230,104 to Falkenberg and in U.S. Pat. No. 3,097,174 to Mertens. Combinations of fatty monoamines and triamines are disclosed in U.S. Pat. No. 3,738,852 to Doi; fatty diamines are disclosed in U.S. Pat. No. 3,728,278 to Tramelli and U.S. Pat. No. 3,581,101 to Gzemski; fatty quaternary and diquaternary salts and modifications thereof are disclosed in U.S. Pat. No. 3,220,953 to Borgfeldt, U.S. Pat. No. 3,867,162 to Elste, U.S. Pat. No. 3,764,359 to Dybalski, U.S. Pat. No. 3,956,524 to Doughty and U.S. Pat. No. 3,466,247 to Ohtsuka, and fatty imidazolines are taught in U.S. Pat. No. 3,445,258 to Ferm.

Generally, asphalt emulsions prepared with fatty amines, fatty diamines, fatty amidoamines, etc., are unstable when mixed with a variety of siliceous or calcareous aggregates. Rapid breaking on the aggregate surface is observed with an increase in stiffening. At this point, the mix becomes unworkable. To overcome this problem, it is common practice to use cutback asphalt instead of asphalt cement for medium set mixing grade asphalt emulsions. Although cutback emulsions prepared with these emulsifiers also break when mixed with the aggregate, the solvent (a hydrocarbon oil, such as naphtha, kerosene, diesel oil, etc.) decreases the viscosity of the asphalt and increases the workability of the aggregate-asphalt mix. After placement of the mixes, the solvent evaporates and the final stiff aggregate-asphalt matrix is obtained. Because of the dramatically increased cost of solvents in recent years and because of the effort to reduce pollution, suitable emulsifiers are sought for mixing grade emulsions without using solvent. The use of tallow quaternary ammonium salts and tallow diquaternary diammonium salts for making emulsions suitable for slurry seal, a solventless application, is described in U.S. Pat. No. 3,764,359 to Dybalsky, and the use of a quaternary amine obtained by reacting epichlorohydrin, trimethylamine and nonylphenol for solventless mixes is disclosed in U.S. Pat. No. 3,956,524 to Doughty.

The general object of this invention is to provide versatile emulsifiers for solventless and solvent containing rapid setting and medium setting mixing grade, oil-in-water bituminous emulsions. Another object of this invention is to provide emulsifier formulations for mixing grade emulsions which give a variety of set times as expressed in percent initial washoff coating (the percent coat on the aggregate surface after one minute mixing and immediate immersion in water) and percent one hour washoff coating. A further object of this invention is to provide new amphoteric amidoamines or imidazolines, prepared by modifying the reaction products of polycarboxylic acids or sulfonated oleic acid or sulfonated tall oil derived fatty acids and polyamines with a variety of reagents such as formaldehyde and sodium sulfite or bisulfite, haloalkane sulfonic acid sodium salts, γ-propane sultone, chlorohydroxy propane sulfonic acid sodium salt, vinyl sulfonic acid sodium salt, haloalkanoic acids, such as chloroacetic acid, α,β-unsaturated carboxylic acids, such as acrylic, metacrylic, fumaric and maleic acid, epoxy carboxylic acids, halo alkane phosphoric acids, formaldehyde and phosphorous acid in the presence of hydrochloric acid, suitable as emulsifiers for both anionic and cationic oil-in-water emulsions. From the literature, it is known that these reagents react with the active nitrogens of amines in Mannich type reactions, by Michael additions or by nucleophilic substitution yielding amino alkyl-sulfonic acids, amino carboxylic acids (amino acids) and amino alkyl-phosphonic acids. These products are amphoteric. They are soluble at both acidic and alkaline pH-values, and at the isoelectric point, where the number of positive charges equals the number of negative charges on the molecule. They do not move when an electrical field is applied, and they show reduced solubility in water.

SUMMARY OF THE INVENTION

It has been found that modified reaction products of polyamines with certain di- and tricarboxylic acids or sulfonated fatty acids give emulsions capable of producing anionic and cationic medium set mixing grade asphalt emulsions, as well as rapid set asphalt emulsions. Solventless asphalts as well as asphalts up to 15% by volume of a hydrocarbon oil can be used for emulsification.

DESCRIPTION OF THE PREFERRED EMBODIMENTS

The polycarboxylic acids used in the preparation of the invention anionic and cationic emulsifiers are of the following general formulae:

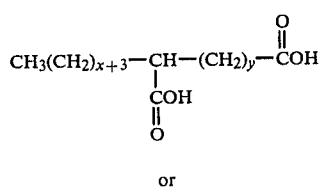

or

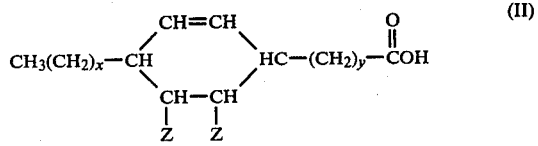

wherein x and y are integers from 3 to 9, x and y together equal 12, at least one Z is a carboxylic acid group and any remaining Z is hydrogen.

These acids are obtained by reaction of carbon monoxide and water with an unsaturated acid, preferably oleic acid, as described by Reppe and Kroper, in Ann 582, 63–65 (1953) in the case of formula I, and by Diels-Alder addition of acrylic, metacrylic, fumaric or maleic acid to polyunsaturated fatty acids with conjugated double bonds in the case of formula II, forming a cyclohexene structure. These acids are referred to as $C_{19}$-dicarboxylic acid, $C_{21}$-dicarboxylic acid and $C_{22}$-tricarboxylic acid. Acids of this type are disclosed in U.S. Pat. Nos. 3,753,968 and 3,899,476 to Ward and U.S. Pat. No. 4,081,462 to Powers et al.

The sulfonated carboxylic acids used in the preparation of the invention emulsifiers are derived by sulfonation of tall oil fatty acids and oleic acid of the following composition:

|  | Oleic Acid | Tall Oil Fatty Acid |
|---|---|---|
| Palmitic Acid | 4.29 | 2.37–5.70 |
| Palmitoleic Acid | 11.00 | 1.03–1.80 |
| Oleic Acid | 72.00 | 43.12–47.13 |
| Elaidic Acid | <1 | <1–23.50 |
| Linoleic Acid | 4.11 | 3.20–33.11 |
| Conjugated Linoleic Acid | 1.4 | 5.30–9.10 |

The sulfonated products are characterized by an acid number from about 220 to 330, saponification number from about 300 to 360.

Sauls and Ruggenberg disclose the sulfonation of oleic acid with sulfur trioxide in liquid sulfur dioxide in U.S. Pat. No. 2,743,288.

Pugh and Chesworth disclose in British Pat. No. 1,278,421 the sulfonation of oleic acid with gaseous sulfur trioxide diluted with an inert gas with a continuously formed liquid film of the unsaturated fatty acid.

The sulfonation of tall oil fatty acid is also disclosed in the above mentioned patents. Because of the complexity of the composition of tall oil fatty acids, no attempt to identify the sulfonated products was made.

Reaction mechanism and all aspects of sulfonation are reviewed in E. E. Gilbert, "Sulfonation and Related Reactions," R. E. Krieger Publishing Company, Huntington, N.Y., 1977.

When the polycarboxylic acids are heated with a polyamine, a variety of reaction products can be obtained. As a general example, the reaction products of the $C_{21}$-dicarboxylic acid and diethylene triamine are described. By blending two mols of diethylene triamine with one mol of $C_{21}$-dicarboxylic acid, a bis-diethylene diammonium salt is formed of the formula

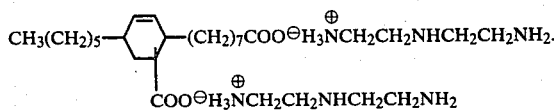
(III)

By heating to 180°-200° C. and terminating the reaction after 1 mol water is distilled off the reaction mixture, the monoamidoamine is formed. Because of steric hindrance at the secondary carboxylic group which is directly bound to the cyclohexene ring, amidoamine formation occurs preferably at the primary aliphatic carboxylic group. The monoamidoamine has the formula

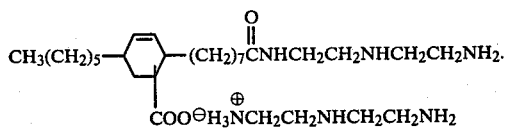
(IV)

Upon further heating to 230° C. and above, the diamidoamine of the formula

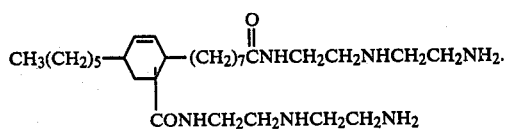
(V)

is formed. At the same time, in a competitive reaction, ring closure to an imidazoline structure is occurring, which is a five membered ring containing two nitrogens, as shown in the following structure:

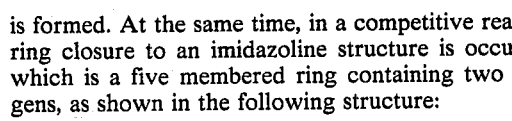
(VI)

Further prolonged heating of (IV) to 270°-280° C. gives the diimidazoline of the formula

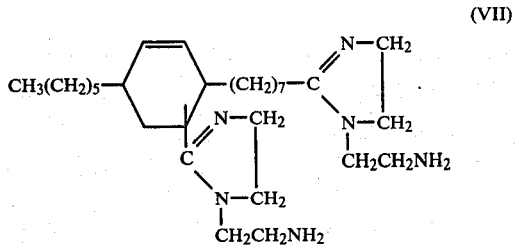
(VII)

These products are, however, never obtained in high purity, since when a blend of two mols diethylene triamine and one mol $C_{21}$-dicarboxylic acid is heated slowly, some of the diethylene triamine distills with the water. Thus, upon prolonged heating, in addition to the products (III), (IV) and (V), polymers of the polyamide type are formed as byproducts. These byproducts can contain polyamidoamine structures and polyimidazoline structures as visualized by the formula:

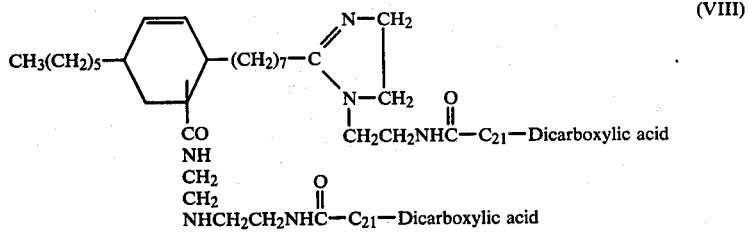
(VIII)

The formation of imidazolines is limited to polyethylene amines and polyamines characterized by at least one ethylene diamine functional group with at least three hydrogens attached to the two nitrogens. Compounds of this group which are able to give both amidoamines and imidazolines are: ethylene diamine, diethylene triamine, triethylene tetramine, tetraethylene pentamine, pentaethylene hexamine, and higher homologues; aminoethyl ethanolamine, N-aminoethyl propane diamine, N,N'-diaminoethyl propane diamine and the N-aminoethyl or N,N'-diaminoethyl substituted butane diamines, pentane diamines and hexane diamines, and N-hydroxy ethyl ethylene diamine. These compounds have the general formulae $H_2NCH_2CH_2NHR$ (IX)
$R = H-, CH_3-, C_2H_5-, C_3H_7-,$
$-CH_2CH_2OH, -(CH_2CH_2NH)_xH$
$x = 1, 2, 3, 4, \ldots 10$
or,
$R_1R_2N(CH_2)_yNHR_3$
$R_1 = H-, CH_3-, C_2H_5-, C_3H_7-, NH_2CH_2CH_2-,$
$R_2 = H-, CH_3-, C_2H_5-,$
$R_3 = H-, CH_3-, C_2H_5-, C_3H_7-, NH_2CH_2CH_2-,$
$y = 2, 3, 4, 5, 6.$ Amines capable of forming amidoamines but not imidazolines are: 1,3-diaminopropane, 1,4-diaminobutane 1,5-diaminopentane, 1,6-diaminohexane, piperazine (1,4-diazacyclohexane), N-aminoethylpiperazine, N-aminopropyl-propane diamine-1,3, N-methyl-N-aminopropylpropane diamine-1,3, N,N-dimethylpropane diamine-1,3, N,N-diethyl propane diamine-1,3, N,N-dimethyl-ethylene diamine, N,N-diethyl ethylenediamine; N-aminohexylhexane diamine-1,6.

A few of these $C_{21}$-dicarboxylic acid-polyamine reaction products, especially the diimidazolines are reported

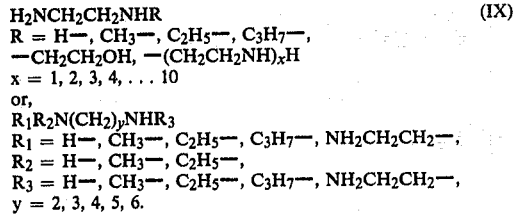

to be reactive resins and co-reactants with epoxy resins. Ethylene diamine, diethylene triamine, triethylene tetramine and tetra ethylene pentamine are specifically mentioned. Reaction products of $C_{19}$-dicarboxylic acid are disclosed in U.S. Pat. No. 2,966,478 to Harrison, and of $C_{21}$-dicarboxylic acid in British Pat. No. 1,046,208 to Crawford and U.S. Pat. No. 4,013,601 to Alford.

The reaction products of the sulfonated fatty acids with polyamines, such as polyethylene amines or blends of suitable primary, secondary, tertiary amines and polyamines, give ammonium salts of sulfonated fatty acid amidoamines or, where applicable, imidazolines. The reaction products of sulfonated oils, fats, higher fatty acids and higher fatty acid esters with organic amines and amides are disclosed in U.S. Pat. No. 2,329,086 to Robinson and Webber for use as softeners for textile materials.

For example, when the major reaction product of sulfonated oleic acid is blended with two mols of diethylene triamine, the diammonium salt will be formed. Upon heating, one mol water is eliminated and the correspondent diethylene triammonium salt of the sulfonated oleic amidoamine is formed.

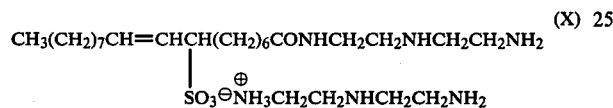

(X)

Further heating gives the corresponding diethylene triammonium salt of the sulfonated imidazoline. All these compounds are amphoteric in nature, thus soluble in both acidic and alkaline media. Based on the higher acidity of the sulfonic acid group, metal salts, such as the potassium salt, or ammonium salts, such as the triethanol ammonium salt, can be formed by addition of one mol of potassium hydroxide in methanol or triethanolamine; and by heating with an additional mol of a polyamine, the corresponding amidoamine is obtained.

These amidoamines and imidazolines should serve as examples of the types of reaction products which one can expect. Since, however, the reaction products of sulfonation of oleic acid and especially tall oil fatty acid are complex, an even more complex mixture of reaction products will result from polyamine treatment.

Polyamines which can be reacted to give amidoamines and imidazolines are described earlier in connection with the polycarboxylic acids.

Further modifications of the above described mono-, di-, or polymeric amidoamines or imidazolines are the reaction products with reactive oxirane systems such as ethylene oxide, propylene oxide or butylene oxide. Reaction occurs preferentially on primary and secondary nitrogens, that is, a nitrogen to which one or two hydrogen atoms are covalently bound. The reaction products belong to the class of N-hydroxyethyl, N-2-hydroxyropyl- and N-2-hydroxy butyl amidoamines or imidazolines. To obtain intermediates for further modification, the nitrogens with active hydrogens attached should be reacted only partially with these three membered ring-oxides.

Combinations of amidoamines, based on fatty monocarboxylic acids of various sources and the $C_{19}$- and $C_{21}$-dicarboxylic acids, $C_{22}$-tricarboxylic acid or sulfonated fatty acids disclosed in this invention, can also be obtained by reacting suitable polyamines with a blend of fatty monocarboxylic and di- or tricarboxylic acids. Monocarboxylic acids suitable for this purpose are tall oil fatty acids, crude tall oil, rosin acids, rosin reacted with fumaric or maleic acid, tall oil pitch, tallow fatty acids, soya fatty acids and the like. Kraft lignin or Vinsol may also be co-reacted.

Dimer acids, which are long chain $C_{36}$-aliphatic carboxylic acids obtained by dimerization of fatty acids of various sources, may be also co-reacted. An example of this type of acid is produced by Emery Industries, Inc. under the trade name "Empol ® Dimer acids".

Depending on the numbers of active nitrogens in these nitrogen-containing derivatives, one, two or more mols of reagent per mol of amidoamine or imidazoline can be reacted. To illustrate the novel modifications of the above described amidoamines and imidazolines, the reaction product of two mols aminoethylpiperazine or diethylene triamine with one mol of $C_{21}$-dicarboxylic acid will serve as intermediates.

In the case of the di-amidoamine

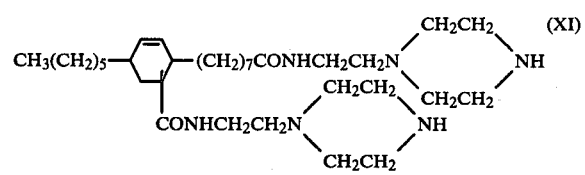

(XI)

one or two mols of reagent can be added to the terminal NH— groups.

In the case of the di-imidazoline

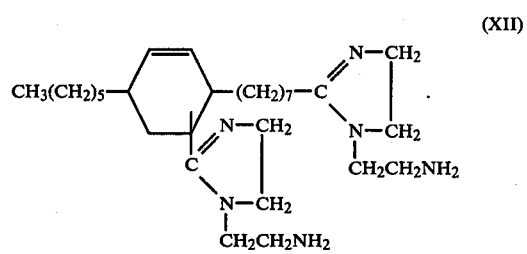

(XII)

one to four mols of reagents will react with the terminal $NH_2$— groups.

The following structures are obtained by reaction with:

(a) formaldehyde and sodium sulfite or bisulfite

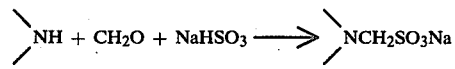

(b) halo-alkane sulfonic acid sodium salts

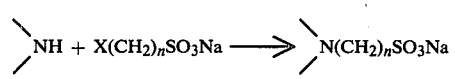

X = Cl, Br, I
n = 1, 2, 3, 4 . . .

(c) γ-propane sultone

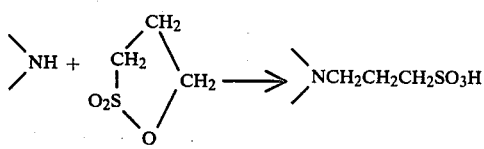

(d) chlorohydroxypropane sulfonic acid sodium salt

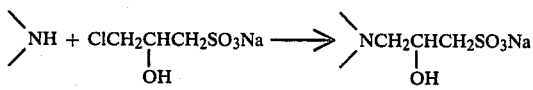

(e) haloalkanoic acids (or sodium salts)

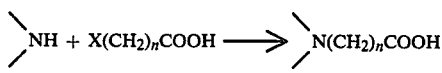

X = Cl, Br, I
n = 1, 2, 3, 4 ...

(f) α,β-unsaturated carboxylic or dicarboxylic acids:

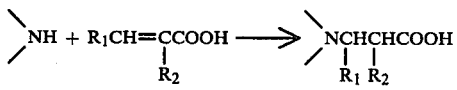

$R_{1,2}$ = H—, alkyl-, —COOH (g) haloalkane phosphonic acids

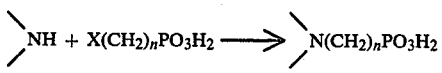

(h) formaldehyde and phosphorous acid in the presence of hydrochloric acid

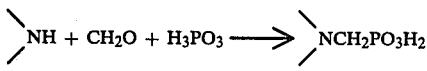

The sulfomethylation of fatty monocarboxylic acid-polyamine condensation products with formaldehyde and bisulfite is taught by Hochreuter in Swiss Pat. No. 571,474. These products are used to improve plastic material, leather or paper. He also describes modification of these sulfonated products by post-alkylation with alkyl halogenides, chloroacetic acid, acrylamide, acrylonitrile, ethylene oxide or propylene oxide, and sulfomethylated quaternary nitrogen compounds. These compounds have anti-static, bactericidal and dirt repellant properties. In Japanese Kokais Nos. 77 65,141 and 77 58,708, Nomoto et al. teach preparation of hydrolyzed reaction product of a lauric acid-aminoethylethanolamine condensate with ethyl acrylate useful as corrosion inhibitor or in cleaning compositions. Takahashi et al. teach the preparation of the carboxyethylated derivatives of the condensation product of oleic acid and diethylene triamine in Japanese Kokai No. 77 108,915 as useful as stabilizer for ethylene oxide-propylene oxide copolymers.

British Pat. No. 1,037,645 describes quaternary nitrogen compounds obtained by reacting the condensation products of oleic acid with aminoethylethanol amine or lauric acid with N,N-dimethyl propane diamine with sodium chlorohydroxy propane sulfonate. Reaction products of fatty acid-polyamine condensates with sodium chloroacetate are taught by Nagata in Japanese Kokai No. 73 42,004 as additives for heavy oil. Reitz and Boehmke in German Offen. No. 2,537,289 teach the condensation of fatty acids with the reaction products of polyamines treated with sodium hydroxyethanesulfonate resulting in products with surfactant properties.

The preferred embodiment of the invention which follows is illustrative of emulsifiers used to obtain asphalt in water emulsions eminently useful for mixing under shear with a variety of siliceous and calcareous aggregates. After setting (evaporation of water), the asphalt films show excellent adhesion to the aggregate surface.

In preparing the bituminous emulsions of this invention, an aqueous soap solution of the emulsifiers described below is intimately mixed under high shear in a colloid mill. The bitumen content can range from 30% to about 80% by weight, preferably between 60% and 70%. The dosage of the emulsifier can range from 0.1–10% by weight of the emulsion, preferably between 0.25–2.5% by weight of the emulsion. Dependent on the emulsifier, a mixing grade cationic emulsion is obtained in a pH range of 1–7, with the optimum performance at a pH of about 2.5 to 4. An anionic mixing grade emulsion, on the other hand, is obtained in a pH range of greater than 7 to 12, with the optimum performance at a pH of about 10 to 11.5.

The "bitumen" used in the emulsion may be derived from domestic or foreign crude oil; it also includes bitumen, natural asphalt, petroleum oil, oil residue of paving grade, plastic residue from coal tar distillation, petroleum pitch, and asphalt cements diluted with solvents (cutback asphalts). Practically any viscosity or penetration graded asphalt cement for use in pavement construction as described in ASTM designation D-3381 and D-946 may be emulsified with the aid of the emulsifiers of the invention.

The acidic soap solutions are normally obtained by suspending the amidoamine in water to which a sufficient amount of a suitable acid, for instance, hydrochloric, sulfuric, and phosphoric acid or the like is added as necessary for the desired pH value of 1–7 and a clear emulsifier solution is obtained. Alkaline soaps are obtained by adding sodium hydroxide or any other suitable base to the aqueous suspension of the emulsifier. Thereafter, the (acidic or alkaline) soap solution, which is preheated to about 55° C., and the fluid asphalt, which is preheated to 120°–125° C., are mixed under high shear in a colloid mill for 30 seconds to give asphalt emulsions of brown color and creamy texture. Prior to testing according to ASTM D-244, the emulsions are stored at 70° C. for 16 hours. Aggregate mixing tests are performed by placing a weighed amount of aggregate in a mixing bowl, adding 5–10% by weight of the emulsion on top of the aggregate and mixing for one minute to five minutes. The mix is divided into three equal parts and placed in three dishes. The first sample is set aside; the second sample is washed with water immediately after mixing; and the third sample is washed with water after it was set aside for one hour. The percent coating of the aggregate surface is estimated visually. From the first sample, the percent initial coating, from the second sample, the percent initial washoff coating, and from the third sample, the percent one-hour washoff coating are obtained. The construction industry coating requirements are generally set at 90–95% minimum.

A typical aqueous bituminous emulsion aggregate slurry is formulated in the laboratory with an amount of aggregate pre-wetted with water and admixed with a suitable bituminous emulsion to a desired consistency. Suitable consistency is obtained by using mixed gradations of aggregates forming a smooth non-separating uniform mixture of aqueous bituminous emulsion-aggregate which can be evenly spaced onto an existing surface. The ultimate toughness of the applied slurry is obtained as the bitumen, such as asphalt, deposits on the aggregate particles and binds the newly applied coating to the pre-existing surface as a mixture of asphalt cement and aggregate.

As a paving technique at the roadsite, a mobile self-propelled unit capable of uniformly metering the aggregate, water, inorganic and organic additives emulsion components, may be used. A typical unit is equipped with separate tanks for aggregate, water, emulsion and additives which are continually metered into a mixing chamber at a pre-determined ratio. The continually fed components are retained in the mixing chamber for approximately one minute and then fed into a spreader-box and applied to the surface to be coated. Batch operated pneumatic devices can also be used for suitable placement of the bituminous aggregate slurries of this invention.

The emulsifiers for the solventless emulsions of this invention perform very satisfactorily without auxiliary emulsifiers. However, occasionally it may be necessary to alter the performance of the emulsion to obtain improved viscosity at a given asphalt content or improved stability to dust and fines on the aggregate and to lengthen or shorten setting time, etc. One of two methods can be employed. In case of cationic slurry seal, either a mixture of tall oil fatty acids, preferably tall oil pitch, can be added to the bitumen (asphalt) prior to emulsification to improve break or improve the viscosity of the emulsion, or blends of the above described modified amidoamines and imidazolines with compatible cationic or nonionic emulsifiers may be used for the emulsification of the bitumen. Auxiliary emulsifiers, which may constitute up to 90% of the total combined emulsifier formulation, are fatty amines, fatty propane diamines, fatty amidoamines, and fatty imidazolines. This class of compounds generally decreases setting time. Others are fatty monoquaternary ammonium salts and fatty diquaternary diammonium salts and nonionic emulsifiers, such as ethylene glycol polyethers of nonyl- or dodecyl phenol.

Modified emulsifier combinations also can be obtained when blends of fatty amines, fatty diamines and amidoamines derived from $C_{19}$-, $C_{21}$-dicarboxylic, $C_{22}$-tricarboxylic acids, sulfonated oleic acid, sulfonated tall oil fatty acids, tall oil fatty acids and resin acids undergo the invention process chemical modifications. Amidoamines or imidazolines of $C_{36}$-dicarboxylic acids (dimerized linoleic acid, etc.) may also be added to the blends.

In the case of anionic emulsions, blends of the amphoteric compounds with emulsifiers commonly used for anionic bituminous emulsions can be employed. Examples of such emulsifiers are fatty acids, especially tall oil, rosin acids, lignin isolated from sulfite or kraft pulping lignins, and sulfonic acid-containing surfactants such as aralkylsulfonates, long chain alkylsulfonates and petroleum sulfonates.

$C_{19}$-dicarboxylic acid, $C_{21}$-dicarboxylic acid, $C_{22}$-tricarboxylic acid or sulfonated fatty acids may also be blended with the amphoteric compounds prior to the addition of alkali.

Depending on the type of aggregate and its cleanliness, mixing is improved when aggregate is prewetted with 1–5% water by weight of the aggregate. The performance of the asphalt emulsions in regard to mixing characteristics and setting (higher percentage of one-hour washoff coat) can, if necessary, also be improved when, based on the weight of asphalt, 1–15% of a solvent such a diesel oil is added to the asphalt prior to emulsification. The emulsions prepared with the emulsifiers disclosed in this invention are stable and can be stored for a long period of time until required for use. Depending on the intended application, the emulsion may be mixed with the aggregate at a central mixing plant in a large pug mill and the mix transported to the job site. Alternatively, the emulsion may be taken to the job site and mixed there, either with a mixing device, such as motorized mixing equipment, or manually.

The aggregates of the invention paving slurry seal mixtures are conventional difficult to coat, densely graded aggregates such as sand, pit-run, crusher-run, etc., which range in size from anything passing through a No. 4 sieve and at least 80% retained on 200 mesh (U.S. Standard Series).

Aggregate mixing tests are performed by mixing the aggregate with water and aqueous bituminous emulsion. An inorganic additive-mineral filler, such as portland cement, hydrated lime, limestone dust and fly ash, may be added to accelerate set/break time and salts, such as ammonium sulfate, aluminum sulfate and other inorganic sulfates, or surfactants may be added to retard the set/break of the slurry system. Mineral fillers shall comply with the requirements of ASTM D242. These materials are mixed in a mixing bowl until a homogeneous slurry mixture is obtained. The inability to form a stable slurry within 3 to 4 minutes of mixing time when proper proportions of each ingredient are used would indicate a mixture in which the materials are not compatible. This mix design is necessary to simulate field conditions. After the slurry is mixed, it is spread in a mold which is placed on an asphalt felt, and the set/break time is measured by blotting the exposed slurry surface with a paper towel. If no brown stain is transferred to the paper towel, the slurry is considered to be "set." The cure time could also be measured with a cohesion testing device. Many other tests such as described in ASTM D3910 are used to measure strength and other physical properties of the slurry. The *Performance Guide for Slurry Seal* published by the Asphalt Emulsion Manufacturers Association is used to measure the performance of the slurry seal.

The emulsion should be stable during mixing and should set within the designed time period following application. The emulsifiers of this invention perform very satisfactorily without auxiliary emulsifiers.

For instance, the setting times can be controlled with the concentration of emulsifier, the addition of lime, cement or an inorganic additive, which would alter the break characteristics of the slurry system. An organic additive-polymer latex may also be employed to strengthen the matrix. The organic additive is preferably added to the emulsion-aggregate slurry.

The bituminous emulsions employed in the invention slurries are slow-setting, mixing grade slurries under ASTM D-2397; however, the set time may be shortened by adding alum (aluminum sulfate), lime or cement, providing an emulsion with quick-setting characteristics.

The practice of this invention may be seen in the following examples wherein the preparation of various types of the emulsifiers of the invention is described and wherein the advantages of using these compounds in a medium setting mixing grade bituminous emulsion and slurry seal applications are illustrated.

EXAMPLE 1

This example illustrates the variety of emulsifiers which can be obtained by modification of the reaction products of $C_{19}$-dicarboxylic acid, $C_{21}$-dicarboxylic acid, $C_{22}$-tricarboxylic acid or sulfonated oleic or tall oil fatty acid with polyamines.

Representative nitrogen-containing intermediates are:

Diamidoamines (Type A)

One mol of either $C_{19}$-, $C_{21}$- or $C_{22}$-polycarboxylic acid was mixed with 2-3 mols of a blend of polyethylene amines consisting of diethylenetriamine, triethylene tetramine, aminoethylpiperazine and aminoethylethanolamine and heated to 240° C. After all the distillate was collected, the reaction products were cooled and diluted with iso-propanol or diethylene glycol. The reaction products are insoluble in diluted aqueous sodium hydroxide.

Monoamidoamines (Type B)

One mol of either $C_{19}$-, $C_{21}$- or $C_{22}$-polycarboxylic acid or sulfonated fatty acid was mixed with 1-3 mols of a blend of polyethylene amines consisting of diethylene triamine, triethylene tetramine, aminoethylpiperazine and aminoethylethanolamine and carefully heated to 180° C.-190° C. After all the calculated amount of distillate was collected, it was cooled and diluted with water or isopropanol. The reaction product is soluble in dilute aqueous sodium hydroxide.

Monoamidoamine (Type C)

One mol of tall oil fatty acid was mixed with 1-1.5 mols of a blend of polyethylene amines consisting of diethylene triamine, triethylene tetramine, aminoethylpiperazine, and aminoethylethanolamine and heated to 180°-210° C. After all the distillate was collected, it was cooled. The reaction product is insoluble in dilute aqueous sodium hydroxide.

Mixed-Monoamidoamines (Type D)

To one mol of blends consisting of 10-90% polycarboxylic acids or sulfonated fatty acid and 90-10% tall oil fatty acid, 1-2.5 mols of polyethylene amines consisting of diethylene triamine, triethylene tetramine, aminoethyl piperazine and aminoethylethanol amine was added and the reactants were heated to 180°-240° C. After all distillate was collected, it was cooled and optionally diluted with iso-propanol.

Imidazolines (Type E)

To one mol polycarboxylic acid, 2-3 mols diethylene triamine was added and heated to 260° C.-280° C. After all the distillate was collected, it was cooled and diluted with iso-propanol. The reaction products are insoluble in dilute aqueous sodium hydroxide. Due to competitive reaction, the di-imidazolines obtained are accompanied by amidoamine-imidazolines and polymeric polyamides.

Modification of nitrogen-containing intermediates:

1. Sulfomethylation:

Based on the molecular weight and on the number of active N—H bonds, 0.1-4 mols of sodium sulfite or sodium bisulfite was dissolved in an adequate amount of water and added to either amidoamine or imidazoline. The reaction is slightly exothermic. To this blend 1-4 mols of formaldehyde in form of paraformaldehyde or as a 37% solution in water was added. The addition is accompanied by an exothermic reaction. Alternatively, formaldehyde may be added to the sulfite solution, and the reaction product formed by these reagents may be added to the nitrogen-containing compounds. Clear solutions were obtained by adjusting the ratio of iso-propanol and water in the final product.

2. Alkylsulfonation:

0.1 to 4 mols of a reactive alkylsulfonic acid sodium salt, such a sodium chloromethane sulfonate, sodium chloroethane sulfonate, sodium chlorohydroxypropane sulfonate or sodium vinyl sulfonate were dissolved in the sufficient water and added to one mol of the amidoamines or imidazolines. After addition, the reaction mixtures were kept for 1-2 hours at 60°-70° C. If necessary, iso-propanol was added to obtain a clear solution. In the case of sulfopropylation, 1-4 mols of γ-propane sultone was slowly added to the nitrogen-containing compounds diluted with an equal amount of isopropanol.

3. Carboxyalkylation:

0.1 to 4 mols of reactive carboxylic acids such as chloroacetic acid or the corresponding sodium salt, acrylic acid, metacrylic acid, fumaric or maleic acid was dissolved, or slurried in iso-propanol or water and added to one mol of amidoamine or imidazoline. The additions were accompanied by a rise in temperature. To ensure completion of the alkylations, the reaction mixtures were kept for 1-2 hours at 60°-70° C.

4. Methyl-phosphonation:

0.1 to 2 mols of chloromethane phosphonic acid (85% active) was added to one mol either amidoamine or imidazoline dissolved in an equal amount of iso-propanol (by weight). The reaction is exothermic. If necessary, water was added to obtain a clear solution.

5. Phosphomethylation:

To one mol of di-amidoamine prepared from $C_{21}$-dicarboxylic acid and a blend of polyethylene amines diluted with iso-propanol to 80% activity, 180 ml of 37% hydrochloric acid was added slowly with good agitation. A mixture of two mols of formaldehyde (37% solution) and 2.5 mols phosphorous acid was slowly added with good agitation and heated for 3 hours at 80° C.

EXAMPLE 2

This example shows the effectiveness of these types of emulsifiers for slurry seal application.

Tables I–V illustrate the quick set times of the slurries prepared in Example 1, as well as the ability to control the set times with addition of a mineral filler (portland cement). The set times are shown in the following tables (I–V). Exxon AC-20 Asphalt and Camak siliceous aggregate were used for most of the experiments.

TABLE I
SET TIMES OF CATIONIC SLURRIES
(Modified Type A - Emulsifiers)

| Emulsifier (Reactants) | Emulsifier Dosage (%) | Emulsion pH Value | Set Time (min.) Without Cement | Set Time (min.) With Cement |
|---|---|---|---|---|
| Type A - Sulfomethylated ($C_{21}$-dicarboxylic acid, formaldehyde, sodium bisulfite) | 1.3 | 2.5 | 60+ | 40 |
| Type A - Methylsulfonated ($C_{21}$-dicarboxylic acid, sodium chloromethane sulfonate) | 1.5 | 2.5 | 60+ | 60+ |
| Type A - Ethylsulfonated ($C_{21}$-dicarboxylic acid, sodium chloroethane sulfonate) | 1.5 | 2.5 | 15 | 45 |
| Type A - Hydroxypropyl sulfonated ($C_{21}$-dicarboxylic acid, sodium chlorohydroxypropane sulfonate) | 1.5 | 2.5 | 60 | 50 |
| Type A - Carboxymethylated[1] ($C_{21}$-dicarboxylic acid, sodium chloroacetate) | 1.3 | 2.5 | 60+ | 10 |
| Type A - Carboxymethylated[2] ($C_{21}$-dicarboxylic acid, sodium chloroacetate) | 1.3 | 2.5 | 45 | 5 |
| Type A - Carboxyethylated[3] ($C_{21}$-dicarboxylic acid, acrylic acid) | 1.3 | 2.5 | 60+ | 50 |
| Type A - Carboxyethylated[4] ($C_{21}$-dicarboxylic acid, acrylic acid) | 1.3 | 2.5 | 60+ | 10 |
| Type A - Carboxy(carboxy)-ethylated ($C_{21}$-dicarboxylic acid, fumaric acid) | 1.5 | 2.5 | 1 | 3 |
| Type A - Methyl phosphonated ($C_{21}$-dicarboxylic acid, chloromethane phosphonic acid) | 1.5 | 2.5 | 60+ | 30 |
| Type A - Phosphomethylated ($C_{21}$-dicarboxylic acid, formaldehyde, phosphorous acid) | 1.5 | 2.5 | 60+ | 1 |

[1]Lower degree of carboxymethylation
[2]Higher degree of carboxymethylation
[3]Lower degree of carboxyethylation
[4]Higher degree of carboxyethylation

TABLE II
SET TIMES OF CATIONIC SLURRIES
(Modified Type B, C and E - Emulsifiers)

| Emulsifier (Reactants) | Emulsifier Dosage (%) | Emulsion pH Value | Set Time (min.) Without Cement | Set Time (min.) With Cement |
|---|---|---|---|---|
| Type B - Carboxymethylated ($C_{21}$-dicarboxylic acid, sodium chloroacetate) | 1.5 | 2.5 | 60+ | 30 |
| Type B - Carboxyethylated ($C_{21}$-dicarboxylic acid, acrylic acid) | 1.5 | 2.5 | 60+ | 1 |
| Type B - Carboxyethylated (Sulfonated oleic acid, acrylic acid) | 1.5 | 2.5 | 1 | 60+ |
| Type C - Carboxymethylated (Tall oil fatty acid, chloroacetic acid) | 1.3 | 2.5 | broke | broke |
| Type C - Carboxyethylated (Tall oil fatty acid, acrylic acid) | 1.3 | 2.5 | broke | 10 |
| Type C - Carboxy(carboxy)-ethylated (Tall oil fatty acid, fumaric acid + maleic acid) | 1.5 | 2.5 | 1 | 60+ |
| Type E - Carboxyethylated ($C_{21}$-dicarboxylic acid, acrylic acid) | 1.5 | 2.5 | 60+ | 20 |
| Type E - Carboxymethylated ($C_{21}$-dicarboxylic acid, chloroacetic acid) | 1.5 | 2.5 | 60+ | 10 |
| Type E - Methylphosphonated ($C_{21}$-dicarboxylic acid, chloromethane phosphonic acid) | 1.5 | 2.5 | 60+ | 15 |
| Type E Carboxyethylated ($C_{22}$-tricarboxylic acid, acrylic acid) | 1.5 | 2.5 | 60+ | 5 |
| Type E - Carboxyethylated ($C_{22}$-dicarboxylic acid, (80% pure) acrylic acid) | 1.5 | 2.5 | 60+ | 20 |

TABLE III
SET TIMES OF ANIONIC SLURRIES
(Modified Type A - Emulsifiers)

| Emulsifier (Reactants) | Emulsifier Dosage (%) | Emulsion pH Value | Set Time (min.) Without Cement | Set Time (min.) With 1% Cement |
|---|---|---|---|---|
| Type A - Sulfomethylated ($C_{21}$-dicarboxylic acid, formaldehyde, sodium bisulfite) | 1.5 | 9.0 | 60 | 10 |
| Type A - Methylsulfonated ($C_{21}$-dicarboxylic acid, sodium chloromethane sulfonate) | 1.5 | 11.5 | 60+ | 60 |
| Type A - Ethylsulfonated ($C_{21}$-dicarboxylic acid, sodium vinyl sulfonate) | 1.5 | 11.5 | 60+ | 60 |
| Type A - | 1.5 | 11.5 | 60 | 60 |

TABLE III-continued
SET TIMES OF ANIONIC SLURRIES
(Modified Type A - Emulsifiers)

| Emulsifier (Reactants) | Emulsifier Dosage (%) | Emulsion pH Value | Set Time (min.) Without Cement | Set Time (min.) With 1% Cement |
|---|---|---|---|---|
| Hydroxypropyl sulfonated ($C_{21}$-dicarboxylic acid, sodium chlorohydroxypropane sulfonate) | | | | |
| Type A - Propylsulfonated ($C_{21}$-dicarboxylic acid, γ-propane sultone) | 1.5 | 11.5 | 60+ | 60 |
| Type A - Sulfomethylated-carboxymethylated ($C_{21}$-dicarboxylic acid, formaldehyde, sodium bisulfite, sodium chloroacetate) | 1.5 | 11.5 | 60+ | 60+ |
| Type A - Carboxymethylated[1] ($C_{21}$-dicarboxylic acid, sodium chloroacetate) | 1.5 | 11.5 | 60+ | 60 |
| Type A - Carboxymethylated[2] ($C_{21}$-dicarboxylic acid, sodium chloroacetate) | 1.5 | 11.5 | 60+ | 25 |
| Type A - Carboxyethylated[3] ($C_{21}$-dicarboxylic acid, acrylic acid) | 1.5 | 11.5 | 60+ | 60+ |
| Type A - Carboxyethylated[4] ($C_{21}$-dicarboxylic acid, acrylic acid) | 1.5 | 11.5 | 60+ | 50 |
| Type A - Carboxy(carboxy)-ethylated ($C_{21}$-dicarboxylic acid, maleic acid, fumaric acid) | 1.5 | 11.5 | 60+ | 40 |
| Type A - Methyl phosphonated ($C_{21}$-dicarboxylic acid, chloromethane phosphonic acid) | 1.5 | 11.0 | 60+ | 7 |

[1]Lower degree of carboxymethylation
[2]Higher degree of carboxymethylation
[3]Lower degree of carboxyethylation
[4]Higher degree of carboxyethylation

TABLE IV
SET TIMES OF ANIONIC SLURRIES
(Modified Type B, C and D - Emulsifiers)

| Emulsifier (Reactants) | Emulsifier Dosage (%) | Emulsion pH Value | Set Time (min.) Without Cement | Set Time (min.) With 1% Cement |
|---|---|---|---|---|
| Type B - Sulfomethylated ($C_{21}$-dicarboxylic acid, formaldehyde, sodium bisulfite) | 1.5 | 11.5 | 60+ | 20 |
| Type B - Carboxymethylated ($C_{21}$-dicarboxylic acid, sodium chloroacetate) | 1.5 | 11.5 | 60+ | 30 |
| Type B - Carboxyethylated ($C_{21}$-dicarboxylic acid, acrylic acid) | 1.5 | 11.5 | 60+ | 60 |
| Type B - Carboxyethylated (Sulfonated oleic acid, chloroacetic acid) | 1.5 | 11.5 | broke | broke |
| Type B - Sulfomethylated (Sulfonated oleic acid, formaldehyde, sodium bisulfite) | 1.5 | 10.5 | 20 | 2 |
| Type B - Sulfomethylated (Sulfonated tall oil fatty acid, formaldehyde, sodium sulfite) | 1.5 | 10.5 | broke | broke |
| Type C - Carboxyethylated[1] (Tall oil fatty acid, acrylic acid) | 1.5 | 11.5 | 60+ | broke |
| Type C - Carboxyethylated[2] (Tall oil fatty acid, acrylic acid) | 1.5 | 11.5 | broke | 2 |
| Type C - Carboxy(carboxy)-ethylated (Tall oil fatty acid, maleic acid, fumaric acid) | 1.5 | 11.5 | broke | broke |
| Type C - Sulfomethylated (Tall oil fatty acid, formaldehyde, sodium bisulfite) | 1.5 | 10.0 | broke | broke |
| Type D - Sulfomethylated[3] ($C_{21}$-dicarboxylic acid + tall oil fatty acid, formaldehyde, sodium bisulfite) | 1.5 | 10.5 | 10 | 5 |
| Type D - Sulfomethylated[4] ($C_{21}$-dicarboxylic acid + tall oil fatty acid, formaldehyde, sodium bisulfite) | 1.5 | 10.5 | broke | 10 |
| Type D - Sulfomethylated[5] ($C_{22}$-tricarboxylic acid + tall oil fatty acid, formaldehyde, sodium bisulfite) | 1.5 | 10.0 | broke | broke |
| Type D - Sulfomethylated[4][5] ($C_{22}$-tricarboxylic acid + tall oil fatty acid, formaldehyde, sodium bisulfite) | 1.5 | 10.5 | broke | 15 |
| Type D - Carboxyethylated[2] ($C_{22}$-tricarboxylic acid + tall oil fatty acid, | 1.5 | 11.5 | 60+ | 15 |

TABLE IV-continued
SET TIMES OF ANIONIC SLURRIES
(Modified Type B, C and D - Emulsifiers)

| Emulsifier (Reactants) | Emulsifier Dosage (%) | Emulsion pH Value | Set Time (min.) Without Cement | Set Time (min.) With 1% Cement |
|---|---|---|---|---|
| acrylic acid) | | | | |

(1) Exxon AC-20 (85-100 penetration)-Asphalt, Camak aggregate
(2) Cobitco AC-20 (85-100 penetration)-Asphalt, Cobitco aggregate
(3) Low amount of tall oil fatty acid
(4) High amount of tall oil fatty acid
(5) Lower reaction temperature

TABLE V
SET TIMES OF ANIONIC SLURRIES
(Modified Type E - Emulsifiers)

| Emulsifier (Reactants) | Emulsifier Dosage (%) | Emulsion pH Value | Set Time (min.) Without Cement | Set Time (min.) With 1% Cement |
|---|---|---|---|---|
| Type E - Sulfomethylated ($C_{21}$-dicarboxylic acid, formaldehyde, sodium bisulfite) | 1.3 | 9.0 | 60+ | 1 |
| Type E - Hydroxypropyl sulfonated ($C_{21}$-dicarboxylic acid, sodium chlorohydroxypropane sulfonate) | 1.5 | 11.5 | 60+ | 40 |
| Type E - Carboxymethylated ($C_{21}$-dicarboxylic acid, chloroacetic acid) | 1.5 | 11.5 | 15 | 10 |
| Type E - Carboxyethylated ($C_{21}$-dicarboxylic acid, acrylic acid) | 1.5 | 11.5 | 60+ | 45 |
| Type E - Carboxyethylated ($C_{19}$-dicarboxylic acid, acrylic acid) | 1.5 | 11.5 | broke | broke |
| Type E - Carboxyethylated ($C_{22}$-tricarboxylic acid, (80% pure) acrylic acid) | 1.5 | 11.5 | 1 | 30 |

EXAMPLE 3

This example illustrates the properties of "solventless" emulsions obtained when the above described emulsifiers were used for emulsification. To show the versatility of these emulsions, various siliceous and calcareous aggregates were used for the mixing experiments. Cationic and anionic emulsions were prepared with Exxon AC-20 based asphalt, having a penetration value of 85-100. Excellent emulsions were obtained when 1.3-1.5% emulsifier dosage was used. Cationic emulsions were prepared in the pH range from 1.5-6.5 with pH 2.5 being the optimum pH value. The pH adjustments were made with dilute hydrochloric acid.

Anionic emulsions were prepared in the pH range of 9.0-12.0 with pH 10-11.5 being the optimum range. The pH adjustments were made with dilute sodium hydroxide.

The test data are given in Tables VI and VII. The aggregate test indicates whether an emulsion is suitable for mixing operations. It was carried out with mixing bowl and spoon. Depending on the cleanliness of the aggregate, it was prewetted with 1-3% water prior to addition of the emulsion. After a 5-9 grams emulsion (per 100 grams of aggregate) was mixed with aggregate for one-minute, initial coating, initial washoff coating, and one-hour washoff coating were determined visually. From these data, the mixing efficiency and set time with a specific aggregate can be determined.

TABLE VI
EVALUATION OF CATIONIC ASPHALT EMULSIONS

| Emulsifier (Reactants) | Emulsifier Dosage (%) | Emulsion pH Value | Aggregate | % Water | % Initial Coating | % Coating After Water Wash (min.) 1 | 30 | 60 |
|---|---|---|---|---|---|---|---|---|
| Type A - Sulfomethylated ($C_{21}$—dicarboxylic acid, formaldehyde, sodium sulfate) | 1.3 | 2.5 | Schloss Tennessee | 2 | 100 | 0 | 70 | 100 |
| | | | River Gravel Tennessee | 2 | 100 | 0 | 100 | 100 |
| | | | Limestone | 2 | 100 | 0 | 50 | 100 |
| Type A - Ethylsulfonated ($C_{21}$—dicarboxylic acid, sodium chloroethane sulfonate) | 1.5 | 2.5 | Schloss Tennessee | 2 | 100 | 40 | 95 | 100 |
| | | | River Gravel Tennessee | 2 | 100 | 5 | 100 | 100 |
| | | | Limestone | 2 | 100 | 20 | 100 | 100 |
| Type A - Carboxymethylated ($C_{21}$—dicarboxylic acid, sodium chloroacetate) | 1.3 | 2.5 | Schloss Tennessee | 2 | 100 | 5 | 90 | 100 |
| | | | River Gravel Tennessee | 2 | 100 | 5 | 100 | 100 |
| | | | Limestone | 2 | 100 | 0 | 70 | 100 |
| Type A - Carboxyethylated ($C_{21}$—dicarboxylic acid, acrylic acid) | 1.3 | 2.5 | Schloss Tennessee | 2 | 100 | 0 | 60 | 100 |
| | | | River Gravel Tennessee | 2 | 100 | 0 | 90 | 100 |
| | | | Limestone | 2 | 100 | 0 | 90 | 100 |
| Type A - Methylphosphonated ($C_{21}$—dicarboxylic acid, chloromethane | 1.5 | 2.5 | Schloss Tennessee | 2 | 100 | 0 | 80 | 100 |
| | | | River Gravel Tennessee | 2 | 100 | 2 | 100 | 100 |

TABLE VI-continued

EVALUATION OF CATIONIC ASPHALT EMULSIONS

| Emulsifier (Reactants) | Emulsifier Dosage (%) | Emulsion pH Value | Aggregate | % Water | % Initial Coating | % Coating After Water Wash (min.) 1 | 30 | 60 |
|---|---|---|---|---|---|---|---|---|
| phosphonic acid) | | | Limestone | 2 | 100 | 0 | 50 | 80 |

TABLE VII

EVALUATION OF ANIONIC ASPHALT EMULSIONS

| Emulsifier (Reactants) | Emulsifier Dosage (%) | Emulsion pH Value | Aggregate | % Water | % Initial Coating | % Coating After Water Wash (min.) 1 | 30 | 60 |
|---|---|---|---|---|---|---|---|---|
| Type A - Sulfomethylated ($C_{21}$—dicarboxylic acid, formaldehyde, sodium bisulfite) | 1.5 | 9.0 | Schloss Tennessee | 2 | 100 | 0 | 50 | 100 |
| | | | River Gravel Tennessee | 2 | 100 | 0 | 90 | 100 |
| | | | Limestone | 2 | 100 | 0 | 30 | 40 |
| Type A - Carboxymethylated ($C_{21}$—dicarboxylic acid, sodium chloroacetate) | 1.5 | 11.5 | Schloss Tennessee | 2 | 100 | 0 | 40 | 80 |
| | | | River Gravel Tennessee | 2 | 100 | 2 | 90 | 100 |
| | | | Limestone | 2 | 100 | 0 | 30 | 80 |
| Type A - Carboxyethylated ($C_{21}$—dicarboxylic acid, acrylic acid) | 1.5 | 11.5 | Schloss Tennessee | 2 | 100 | 0 | 20 | 90 |
| | | | River Gravel Tennessee | 2 | 100 | 5 | 90 | 100 |
| | | | Limestone | 2 | 100 | 0 | 30 | 60 |
| Type A - Methylphosphonated ($C_{21}$—dicarboxylic acid, chloromethane phosphonic acid) | 1.5 | 11.0 | Schloss Tennessee | 2 | 100 | 0 | 100 | 100 |
| | | | River Gravel Tennessee | 2 | 100 | 2 | 100 | 100 |
| | | | Limestone | 2 | 100 | 0 | 80 | 100 |
| Type B - Sulfomethylated ($C_{21}$—dicarboxylic acid, formaldehyde, sodium bisulfite) | 1.5 | 10.5 | Schloss Tennessee | 2 | 100 | 2 | 15 | 30 |
| | | | River Gravel Tennessee | 2 | 100 | 2 | 90 | 100 |
| | | | Limestone | 2 | 100 | 2 | 30 | 60 |
| Type C - Sulfomethylated (Tall oil fatty acid, formaldehyde, sodium bisulfite) | 1.5 | 10.0 | Schloss Tennessee | 2 | broke | | | |
| | | | River Gravel Tennessee | 2 | broke | | | |
| | | | Limestone | 2 | broke | | | |
| Type D - Sulfomethylated ($C_{21}$—dicarboxylic acid + tall oil fatty acid, formaldehyde, sodium bisulfite) | 1.5 | 10.5 | Schloss Tennessee | 2 | 100 | 2 | 30 | 50 |
| | | | River Gravel Tennessee | 2 | 100 | 5 | 95 | 100 |
| | | | Limestone | 2 | 100 | 2 | 70 | 90 |
| Type D - Sulfomethylated ($C_{22}$—tricarboxylic acid + tall oil fatty acid, formaldehyde, sodium bisulfite) | 1.5 | 10.0 | Schloss Tennessee | 2 | 100 | 0 | 100 | 100 |
| | | | River Gravel Tennessee | 2 | 100 | 0 | 100 | 100 |
| | | | Limestone | 2 | 100 | 0 | 100 | 100 |

While this invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A bituminous emulsion comprising from about 30% to about 80% by weight of bitumen, from about 0.1% to about 10% by weight of an amphoteric emulsifier selected from the group consisting of reaction products of nitrogen-containing intermediates with compounds selected from the group consisting of formaldehyde and sodium sulfite or bisulfite, chloroalkane sulfonic acid salts, γ-propane sultone, chloromethane phosphonic acid, acrylic acid, fumaric acid, maleic acid and chloroalkanoic acids, wherein the nitrogen-containing intermediates are selected from the group consisting of amphoteric reaction products of polyamines reacted with sulfonated carboxylic acids and amphoteric reaction products of polyamines reacted with polycarboxylic acids corresponding to the formulae

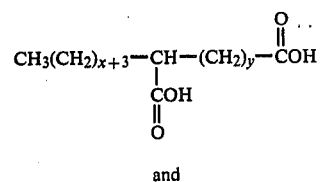

and

-continued

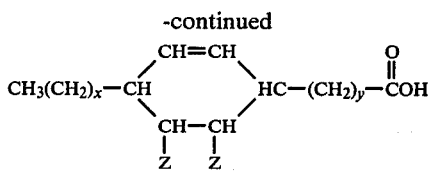

wherein x and y are integers from 3 to 9, x and y together equal 12, at least one Z is a carboxylic acid group and any remaining Z is hydrogen, and water to make up 100% by weight, the emulsion having a pH in the range of from 2 to 12.

2. The bituminous emulsion of claim 1 wherein the emulsion is a mixing grade composition.

3. The bituminous emulsion of claim 1 comprising from about 60% to 70% bitumen by weight of the emulsion, from about 0.25% to 2.5% emulsifier by weight of the emulsion, and water to make up 100% by weight.

4. The bituminous emulsion of claim 1 including up to 90% of the total emulsifier of one or more auxiliary emulsifiers selected from the group consisting of fatty amines, fatty propane diamines, fatty amidoamines, fatty imidazolines, fatty monoquaternary ammonium salts, fatty diquaternary diammonium salts, and ethylene glycol polyethers of nonyl or dodecyl phenol.

5. The bituminous emulsion of claim 1 including up to 90% of the total emulsifier of one or more auxiliary emulsifiers selected from the group consisting of nitrogen derivatives of resin acids and nitrogen derivatives of kraft lignin.

6. The bituminous emulsion of claim 1 wherein the nitrogen-containing intermediate is prepared by reacting the polyamine with the polycarboxylic acid of claim 1 and a blend of acids selected from the group of fatty monocarboxylic acids and dimer acids.

7. The bituminous emulsion of claim 1 wherein the nitrogn-containing intermediate is prepared by reacting a polyamine with a blend of resin acids and the acid of claim 1.

8. The bituminous emulsion of claim 1 wherein the nitrogen-containing intermediate is prepared by reacting the polyamine with a blend of kraft lignin and the polybasic acid of claim 1.

9. The bituminous emulsion of claim 1 wherein the emulsion includes from 1% to 15% by volume of a hydrocarbon oil.

10. The bituminous emulsion of claim 1 wherein a mixture of tall oil fatty acids is added to the bitumen prior to emulsification.

11. The bituminous emulsion of claim 10 wherein the tall oil fatty acids mixture is tall oil pitch.

12. The bituminous emulsion of claim 1 wherein the nitrogen-containing intermediate is prepared by reacting a polyamine with a blend of the sulfonated carboxylic acid of claim 1 and fatty carboxylic acids selected from the group consisting of fatty mono-, di- and tricarboxylic acids and mixtures thereof.

13. The bituminous emulsion of claim 1 wherein the nitrogen-containing intermediate is prepared by reacting a polyamine with a blend of resin acids and a sulfonated carboxylic acid.

14. The bituminous emulsion of claim 1 wherein the nitrogen-containing intermediate is prepared by reacting a polyamine with a blend of kraft lignin and a sulfonated carboxylic acid.

15. The bituminous emulsion of claim 1 wherein the emulsion is cationic and the pH range is from 1 to 7.

16. The bituminous emulsion of claim 15 wherein the pH is 2.5 to 4.

17. The bituminous emulsion of claim 1 wherein the emulsion is anionic and the pH range is from 7 to 12.

18. The bituminous emulsion of claim 17 wherein the pH is 10 to 11.5.

19. A paving slurry seal mixture of an aqueous bituminous emulsion and mineral aggregate capable of being worked comprising: a densely graded mineral aggregate passing through No. 4 and at least 80% retained on 200 mesh screen; from about 8% to about 20% of an oil in water type emulsion, based on the weight of the mineral aggregate, wherein the emulsion is comprised of from about 55% to about 65% bitumen, based on the weight of the emulsion, from about 0.5% to about 2% of an amphoteric emulsifier based on the weight of the emulsion, and water to make up 100% by weight of the emulsion; from about 4% to about 16% water, based on the weight of the mineral aggregate, added to form a slurry of the aggregate and the emulsion; and up to 3% of an inorganic or organic additive to reduce the setting time of the mixture, wherein the emulsifier is the reaction product of nitrogen-containing intermediates with compounds selected from the group consisting of formaldehyde and sodium sulfite or sodium bisulfite, chloroalkane sulfonic acid salts, γ-propane sultone, chloroalkane phosphonic acids, acrylic acid, fumaric acid, maleic acid and chloroethanoic acids and the nitrogen-containing intermediates are formed as the reaction product of polyamines reacted with a sulfonated carboxylic acid selected from the group consisting of sulfonated tall oil fatty acid and sulfonated oleic acid, and the reaction product of one or more polyamines reacted with polycarboxylic acids corresponding to the formulae

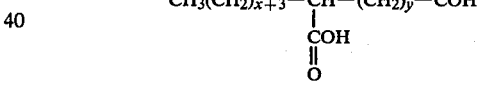

and

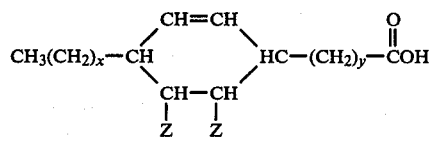

wherein x and y are integers from 3 to 9, x and y together equal 12, at least one Z is a carboxylic acid group and any remaining Z is hydrogen.

20. The paving slurry seal mixture of claim 19 wherein the emulsion is a slow-setting, mixing grade composition.

21. The paving slurry seal mixture of claim 19 wherein up to 90% of the total emulsifier is comprised of one or more auxiliary emulsifiers selected from the group consisting of fatty amines, fatty propane diamines, fatty amidoamines, fatty imidazolines, fatty monoquaternary ammonium salts, fatty diquaternary diammonium salts, and ethylene glycol polyethers of nonyl or dodecyl phenol.

22. The paving slurry seal mixture of claim 19 wherein up to 90% of the total emulsifier is comprised of one or more auxiliary emulsifiers selected from the group consisting of nitrogen derivatives of resin acids and nitrogen derivatives of kraft lignin.

23. The paving slurry seal mixture of claim 19 wherein the nitrogen-containing intermediate is prepared by reacting the polyamine with a blend of the sulfonated carboxylic acid and fatty carboxylic acids selected from the group consisting of fatty mono-, di- and tricarboxylic acids and mixtures thereof.

24. The paving slurry seal mixture of claim 19 wherein the nitrogen-containing intermediate is prepared by reacting the polyamines with a blend of resin acids and the sulfonated carboxylic acid.

25. The paving slurry seal mixture of claim 19 wherein the nitrogen-containing intermediate is prepared by reacting the polyamines with a blend of kraft lignin and the sulfonated carboxylic acid.

26. The paving slurry seal mixture of claim 19 wherein the emulsion is cationic comprising from about 55% to 65% bitumen by weight of the emulsion, from about 1.3% to 1.5% emulsifier by weight of the emulsion, and water to make up 100% by weight, the emulsion having a pH from 1.5 to 6.5.

27. The paving slurry seal mixture of claim 26 wherein the pH is 2.5.

28. The paving slurry seal mixture of claim 19 wherein the emulsion is anionic, comprising from about 55% to 65% bitumen by weight of the emulsion, from about 1.3% to 1.5% emulsifier by weight of the emulsion, and water to make up 100% by weight, the emulsion having a pH from 9 to 12.

29. The paving slurry seal mixture of claim 28 wherein the pH is from 10 to 11.5.

* * * * *